United States Patent
Bianchi et al.

(10) Patent No.: US 9,226,479 B2
(45) Date of Patent: Jan. 5, 2016

(54) MOBILE TELEPHONE DOG TRAINING TOOL AND METHOD

(71) Applicant: EB Partners, Austin, TX (US)

(72) Inventors: James C. Bianchi, Karnes City, TX (US); Robert W. Holland, Austin, TX (US)

(73) Assignee: EB Partners, Austin, TX (US)

( * ) Notice: Subject to any disclaimer, the term of this patent is extended or adjusted under 35 U.S.C. 154(b) by 49 days.

(21) Appl. No.: 13/790,548

(22) Filed: Mar. 8, 2013

(65) Prior Publication Data

US 2014/0251232 A1 Sep. 11, 2014

(51) Int. Cl.
*A01K 15/02* (2006.01)

(52) U.S. Cl.
CPC .................................. *A01K 15/021* (2013.01)

(58) Field of Classification Search
CPC .... A01K 15/00; A01K 15/021; A01K 15/023
USPC .......................................................... 119/720
See application file for complete search history.

(56) References Cited

U.S. PATENT DOCUMENTS

| | | | |
|---|---|---|---|
| 6,067,018 A | 5/2000 | Skelton et al. | |
| 6,232,880 B1 | 5/2001 | Anderson et al. | |
| 6,271,757 B1 | 8/2001 | Touchton et al. | |
| 6,310,553 B1 | 10/2001 | Dance | |
| 6,437,727 B2 | 8/2002 | Lemelson et al. | |
| 6,581,546 B1 | 6/2003 | Dalland et al. | |
| 6,700,492 B2 | 3/2004 | Touchton et al. | |
| 6,720,879 B2 | 4/2004 | Edwards | |
| 6,874,447 B1 * | 4/2005 | Kobett | 119/712 |
| 7,034,695 B2 | 4/2006 | Troxler | |
| 7,751,282 B2 * | 7/2010 | Holmes et al. | 367/128 |
| 8,115,642 B2 * | 2/2012 | Thompson et al. | 340/573.3 |
| 8,314,695 B2 | 11/2012 | Greenberg | |
| 8,336,245 B2 | 12/2012 | Lalor | |
| 8,457,595 B2 * | 6/2013 | MacInnis et al. | 455/410 |
| 2005/0000468 A1 | 1/2005 | Giunta | |
| 2005/0066912 A1 | 3/2005 | Korbitz et al. | |
| 2007/0204804 A1 | 9/2007 | Swanson et al. | |
| 2008/0036610 A1 * | 2/2008 | Hokuf et al. | 340/573.3 |
| 2008/0159079 A1 | 7/2008 | Dir et al. | |
| 2009/0102668 A1 * | 4/2009 | Thompson et al. | 340/573.3 |
| 2010/0139576 A1 * | 6/2010 | Kim et al. | 119/721 |
| 2010/0321182 A1 * | 12/2010 | Wangrud | 340/539.13 |
| 2012/0252486 A1 | 10/2012 | Lopez et al. | |
| 2012/0312250 A1 * | 12/2012 | Jesurum | 119/721 |
| 2013/0008391 A1 | 1/2013 | Berntsen | |
| 2013/0157628 A1 * | 6/2013 | Kim et al. | 455/414.1 |

* cited by examiner

*Primary Examiner* — Joshua Huson
(74) *Attorney, Agent, or Firm* — Terrile, Cannatti, Chambers & Holland, LLP; Robert W. Holland

(57) ABSTRACT

A mobile telephone adapts to use as a gundog training tool by interfacing with a dog collar using a wireless communication device, such as a WWAN text or IP interface, a WLAN interface or a radio transceiver that couples to the mobile telephone and is accessible to a training application running on the mobile telephone. The dog collar includes a GPS receiver to provide position information to the mobile telephone and a shock device to provide training stimulus to the dog. A wireless headset interfaces with the mobile telephone to provide audible indications of position to an end user, such as a dog point and tone indicators of directions to the dog. A wireless handset interfaces with the mobile telephone to accept inputs for application to the collar, such as training stimulus.

23 Claims, 3 Drawing Sheets

MOBILE TELEPHONE DOG TRAINING TOOL AND METHOD

BACKGROUND OF THE INVENTION

1. Field of the Invention

The present invention relates in general to the field of dog training, and more particularly to a mobile telephone dog training tool and method.

2. Description of the Related Art

Kali Bianchi recently completed an upland game bird grand slam. Kali is a French Brittany, L'Epagneul Breton. Her story is captured in "It's all about the Dog," published in the *Publication of the Club de l'Epagneul Breton of the United States*, Second Semester 2012, Issue 35. Kali never had formal training to speak of Kali, like most successful gun dogs, had good genetic cloth woven into a hardy hunting companion by her love of her master.

Although Kali lacks formal training credentials, she did learn some basic skills the hard way at the old-fashioned South Texas school of hard knocks. She learned to listen when told to come or she would get chased down. She learned to avoid rattlesnakes after getting whacked on the nose by a de-fanged rattler. She learned that skunks stink and that dogs that smell like skunk do not get love. She learned that when the boots and gun came out, she better pick up and go because good things usually happen. Kali learned where birds hide with time and freedom on her hunts to investigate promising cover. When the cover was taller than her short stature, a bell around her neck and swishing weeds generally indicated her whereabouts. During the excitement of a hunt, the absence of noise meant a point and Kali had learned to find her quarry.

Kali grew up on a South Texas ranch with lots of room to roam and learn about the outdoors. Many gun dog pups do not share Kali's good fortune. City dogs that do not get to experience the outdoors as Kali did often have difficulty adapting to hunting unless they receive some sort of formal training Professional kennel trainers who train many dogs simply do not have time for old-fashioned, hands-off training like that Kali received. If, for example, a professional kennel trainer had to chase down every pup that failed to come when called, not much training would get done. Instead, professionals typically use training tools that help teach dogs what to do and what not to do.

One prominent dog training tool is the shock collar, which applies an electric shock to a dog's skin in response to a remote activation at a radio controller held by a trainer. After a dog learns the meaning of a command, like "come," application of a shock helps to ensure compliance when the dog hesitates or chooses not to listen. Some shock collars include or work with Global Position Satellite (GPS) receivers that aid a trainer in the field by letting the trainer track the dog's position on a display included with the radio controller. Examples of such systems include the GARMIN ASTRO and ALPHA systems. Some pet recovery systems use GPS to track lost dogs and report the position of the dog to an owner through a website or smartphone application, such as the SPOTLIGHT pet recovery system available from the American Kennel Club. After a dog learns verbal commands, advanced training usually involves the use of whistles to send commands over long distances. A good trainer who uses training tools in an appropriate manner can have a dog with smart genes trained to hunt in a month or two.

One difficulty with training dogs using shock collars is that dogs become "collar smart." If a dog figures out that he only gets shocked when a collar is on, he soon learns not to behave absent the collar. Worse, if the dog learns that the trainer has a shock collar but the master does not, the dog might decide to hear the trainer but not the master—who, incidentally, pays the trainer and buys the dog food. Most city dwellers burn years of kitchen passes when they buy an expensive hunting dog. If that dog won't hunt, the poor fellow has to do a load of dishes to pay for an expensive training collar. Ironically, once he gets the collar and puts it on the dog, he will probably not have to use it more than a couple of times to teach the dog to listen.

Simple old-fashioned training worked with Kali, but that bell around her neck has made her hard of hearing in her old age; as a result, the whistle too often goes unheard. New-fangled training tools work and help to make hunting more pleasurable for both the dog and his master. A hunter should not have to spend a lifetime of kitchen passes to have training tools—bells and whistles included—that work at home, work simply, and work well.

SUMMARY OF THE INVENTION

Therefore a need has arisen for a system, apparatus and method which adapt a mobile telephone to work as a dog training tool.

In accordance with the present invention, a system and method are provided which substantially reduce the disadvantages and problems associated with previous methods and systems for training a dog. A training application executing on a mobile computing platform, such as a mobile telephone or tablet computer, provides interactions with a training module deployed at a dog collar to perform training functions. Processing, display and communication resources of a mobile telephone are leveraged to provide a dog training system that is simple, reliable and not costly.

More specifically, in one embodiment, a mobile telephone processor executes a training application that coordinates training information and actions for training a dog, such as a pointer bird dog. The training application communicates with a dog collar using existing WWAN, WLAN and/or WPAN interfaces of the mobile telephone. The dog collar includes a GPS receiver that sends dog position information to the training application for presentation on the mobile telephone display, such as with a map of a hunt boundary that shows the relative position of the mobile telephone to the dog, to other dog collars and to other mobile telephones interfaced through an ad hoc, client/server or other type of WLAN supported by an 802.11 interface or by a mobile telephone circuit Internet interface transmitted through a mobile telephone service provider network. A shock device on the collar provides corrective stimulus to the dog based on a wireless signal issued from the mobile telephone. A headset and handset interface with the mobile telephone through a WPAN interface so that an end user may issue commands to the mobile telephone and listen to information from the mobile telephone in a hands-off mode. For instance, a wireless microphone accepts a verbal command "where dog?" to the training application running on the mobile telephone. The training application responds to the command by determining the dog position from the collar GPS retrieved through a text message sent by a WWAN mobile telephone circuit. Once the training application receives the dog's GPS position, the training application issues an audible "100 yards west" to the end user through a wireless headset Voice over Internet Protocol (VoIP) and videoconferencing supported through a WLAN or WWAN Internet interface allows a hunter to communicate verbally with a dog over an extended distance through a speaker of the collar and to see via a remote camera what the dog is pointing.

The present invention provides a number of important technical advantages. One example of an important technical advantage is that the processing and communication capabilities of a smartphone are leveraged to enhance dog training with communications to a dog collar. Knowing the position of a dog and other hunters through mobile telephone communications enhances dog training and hunter safety. Hands-off control of dog activity through wireless peripherals of a smartphone allows a hunter to perform dog training activities without fumbling for a phone or other device. Leveraging smartphone capabilities to interact with a dog collar provides top-rate performance at an everyman cost controllable by an end user, who chooses whether to rely on basic mobile telephone WLAN 802.11 capabilities with minimal hardware costs or to rely on more expensive and expansive capabilities provided by interacting with a dog collar over a WWAN mobile telephone account or with an adapter that extends the range of direct radio communications by the mobile telephone to the dog collar.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Mobile telephones provide a dog training tool by interacting with a wireless communication module included on a collar on the dog. Depending upon the needs and desires of the dog's master, the mobile telephone provides short or long range training assistance, such as presentation of a GPS location of the dog relative to the master and stimulation to the dog from a shock collar or other training aid located on the collar. A training application running on the mobile telephone provides training functions that coordinate communications with one or more dog collars and with one or more other mobile telephones. For example, an ad hoc network within a hunting boundary is defined by plural training applications running on plural mobile telephones to provide enhanced coordination of dog training activities. The training application leverages capabilities generally included in mobile telephones so that advanced features are provided without costly specialized hardware. Mobile telephones, also known as cell phones or cellular phones, will work with a remote dog collar as envisioned herein by using existing wireless capabilities of the mobile telephone to communicate directly with a dog collar by a radio communication from the mobile phone directly to the dog collar and from the dog collar directly to the mobile phone. Generally, a mobile telephone has a form factor that provides a telephone handset, a touchscreen display to present information and accept inputs, and at least a WWAN transceiver to communicate wirelessly with a mobile telephone service provider network, such as with voice telephone communications, text message communications and data Internet communications like a web browser. In addition, a mobile telephone usually includes an 802.11 transceiver in the 2.4 and/or 5 GHz band to communicate through a wireless local area network (WLAN) and to communicate via short range wireless personal area network (WPAN) Bluetooth interfaces and a 60 GHz short range antenna for WPAN peripheral communications. Other types of mobile computing devices that include similar capabilities may also be used with the dog collar describe herein, such as tablet computing devices equipped with WWAN and WLAN capabilities.

Figure 1:
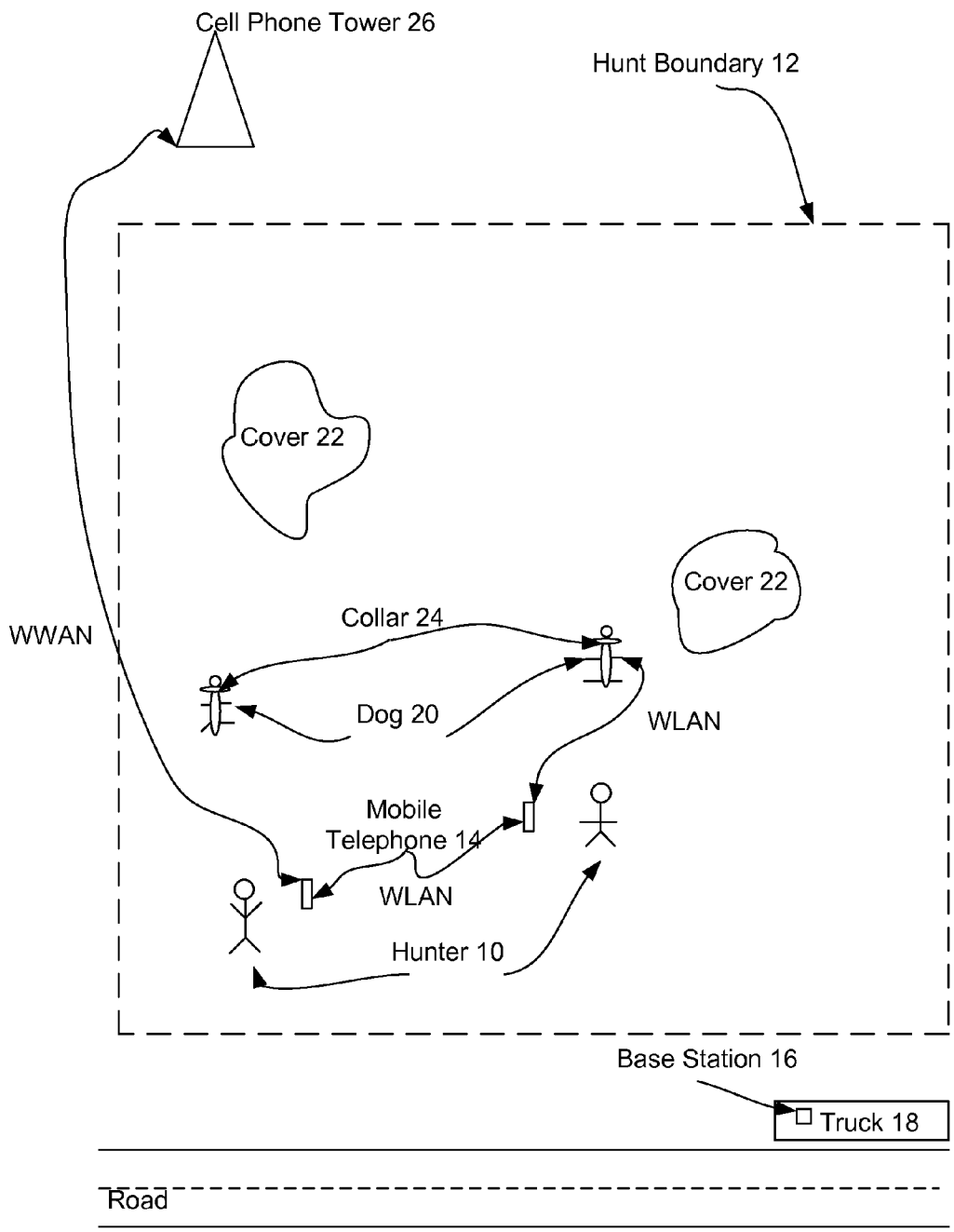
FIG. 1 depicts an example of a mobile telephone dog training system deployed in a hunting environment.

Referring now to FIG. 1, an example is depicted of a mobile telephone dog training system deployed in a hunting environment. Plural hunters 10 are deployed within a hunt boundary 12, each with a mobile telephone 14 that communicates through at least one wireless network. A base station 16 located at a truck 18 may be a mobile telephone or other computing device, such as a laptop or tablet computer, having an oversized antenna and amplified wireless signal to act as a relay or repeater station between mobile telephones 14 or between network communications, such as a WWAN and WLAN communication. Although the example embodiment uses mobile telephones 14 with hunters 10, in alternative embodiments, other computing devices may be used. Examples of mobile telephones 14 include APPLE iPhones, SAMSUNG GALAXY phones or other types of smartphones. Examples of base station 16 include APPLE iPADs, ANDROID-based tablets or other portable computer systems, such as clamshell laptop devices. In one example embodiment, hunt boundary 12 is the training area of a kennel so that base station 16 is a fixed desktop computer system.

One or more dogs 20 are deployed in hunting boundary 12, such as to hunt one or more areas of cover 22 for game birds like quail or pheasant. Each dog has a collar 24 that includes a communication module for communicating with mobile telephones 14 and each collar has a training module for providing a training function coordinated with mobile telephones 14. Communications between mobile telephones 14, base station 16 and collars 24 are supported in a number of different manners depending on the types of communication bands and protocols that are supported by mobile telephones 14 and collars 24. In one embodiment, a wireless local area network (WLAN) device, a wireless wide area network (WWAN) device and a wireless personal area network device (WPAN) are selectively included on each of mobile telephones 14 and collars 24 by assembly of one or more appropriately configured wireless communication modules to collar 24. Wireless communication coordinated through one or several of these wireless communication devices provides training applications running on mobile telephones 14 and base station 16 with training information for each other and collars 24, such as GPS positions, and with a medium for sending training commands, such as shock collar stimulus.

One example of wireless communications is communicating training information and commands between a collar 24 and a mobile telephone 14 through an IEEE 802.11(n) ad hoc or server/client WLAN interface. For instance, a training application on a mobile telephone 14 acts as a server and one or more collars 24 act as clients that send the server GPS position information, images from a camera aligned with a direction of a point for the dog 20 wearing the collar 24, a point alert from detection of lack of motion with an accelerometer in the collar 24, or other types of training information. The mobile telephone 14 server sends training commands to the one or more collars 24 that issue an electric shock or other stimulation at the collar, issue an oral command from a speaker on the collar, such as with a VoIP interface or with stored oral commands in a memory on the collar 24, or issue other types of commands. In an outdoor line-of-sight environment, an 802.11(n) WLAN interface has a range of approximately 250 m. If a collar 24 becomes out-of-range from one mobile telephone 14, then a second mobile telephone 14 that receives communications with the collar 24 and the other mobile telephone 14 can relay the training information and commands between the out-of-range collar and mobile telephone. Further, a WLAN interface between two or more mobile telephones 14 allows VoIP communication between the mobile telephones 14 so that hunters verbally communicate with each other. Although the example embodiment describes the use of 802.11(n) in the 5 GHz frequency range, in alternative embodiments, 802.11(b) or (g) may be used with a possible increased range in the 2.4 GHz frequency range. In one example embodiment, a secured 802.11 network protected by a key or with HTTPS protocol may be used to avoid intrusion by others in the WLAN.

If a collar 24 becomes out of range for a WLAN interface with 802.11(n), WWAN communications may be used both with and without coordination by a cell phone tower 26. For instance, in remote areas mobile telephone service is sometimes not available or not reliable. In a situation where cell phone tower 26 is available, training applications on each mobile telephone 14 may use an Internet Protocol (IP) interface through a mobile telephone provider circuit to perform the same types of communications as are available through WLAN communications as described above. For instance, a VoIP, SKYPE or FACETIME communication will allow images and/or commands to be communicated between a collar 24 and a mobile telephone 20. As an alternative, text messages may be used to communicate information, such as with simple text, in an XML format or as a script executable by the training application. As an example, a collar 24 sends a text message with a GPS position at predetermined time intervals, such as every 10 seconds. As an alternative example, to save battery power at collar 24, a text message with a GPS position is sent based upon at least a predetermined change in position. For instance a text message is sent every 10 seconds unless the collars position has not changed by more than 10 feet, in which case no text message is sent until a position change of greater than 10 feet is detected or a greater time period has elapsed, such as another minute. This saves battery power during rest periods or when a dog is on point. Text messages may include attachments sent from a collar, such as an image captured by a camera associated with a collar. Text messages sent to a collar may include commands, such as a direction for the dog to turn, which is issued as an audible command by a speaker to have the dog 20 move in a desired direction. In one embodiment, a collar 24 intercepts IP packets or text messages sent from a mobile telephone by knowing the mobile telephone's network communication security codes so that the IP packet or text message need not transfer through a phone circuit at all. In alternative embodiments, other types of direct two-way communications may be accomplished between a mobile telephone 14 and a collar 24 with the WWAN or the WLAN frequency and protocol in the absence of mobile telephone service through a cell tower 26, such as through coordination with a mobile telephone service provider. One example is to re-program a WNIC of a mobile telephone to provide analog signals in the WWAN or WLAN frequencies to allow the mobile telephone to be used like a touch to talk service that mimics walkie talkie behavior or a remote control (RC) transceiver device. As one example, a WWAN type service may be provided with a WIMAX type of protocol, which provides approximately 1 mile of range.

A WPAN has a short range, such as that provided by 60 GHz frequency range protocols, Bluetooth or similar short range communication devices that support peripherals like wireless headsets for mobile telephones. In one example, a wireless headset is used by the training application running on the mobile telephone to issue audible information for a hunter or accept commands from a hunter. For instance, a lock tone is provided when the training application receives an indication from a collar that a dog as gone to point. The tone beeps at varying frequencies and with other alterations in sound to guide the hunter to the point, such as higher frequency tones when the mobile telephone is moving closer to the collar and lower frequency tones when the mobile telephone is moving further from the collar. A flush tone issues when the hunter reaches the location of the point as a warning to the hunter and as a warning to other hunters who have mobile telephones wirelessly interfaced with the hunter's mobile telephone or the dog's collar. As another example, a wireless handset coupled with an armband accepts inputs to buttons programmable by the hunter to accomplish training tasks, such as issuing stimulation from a shock device. As another example, a wireless camera mounted on top of the dog's head communicates images to a collar 24 so that the camera need not have a wired connection to the collar 24.

Hunt boundary 12 may be predefined before a hunt so that collars 24 will issue audible warnings if a dog attempts to leave the boundary, followed by stimulation. The boundaries and a map of the hunt area are stored on mobile telephone 14 ahead of time, such as from the Internet, in case phone service is not available to download a map during a hunt, such as at a remote location outside of the range of a mobile telephone service provider network. Hunt boundaries 12 may be programmed in memory of each collar 24 for an automated wireless fence around the hunt area enforced by logic at the collar or may be monitored automatically by a training application so that warnings and stimulations are sent through the WLAN or other communication medium as needed based upon a collar's position. In alternative embodiments, a base station 18 may be used to define a wireless fence at a hunter's home for use of the system when not hunting. For instance, the base station activates a "home" boundary loaded in memory of the collar so that logic on the collar can issue a stimulation if the position of the collar approaches, reaches or exceeds the home boundary. The boundary may be re-programmed as desired through a WLAN interface between the base station and collar. Breach of the boundary can also be programmed to notify the dog owner via mobile telephone that the escape has occurred and reduce the amount of time required to retrieve the wandering dog and the associated stress.

Figure 2:
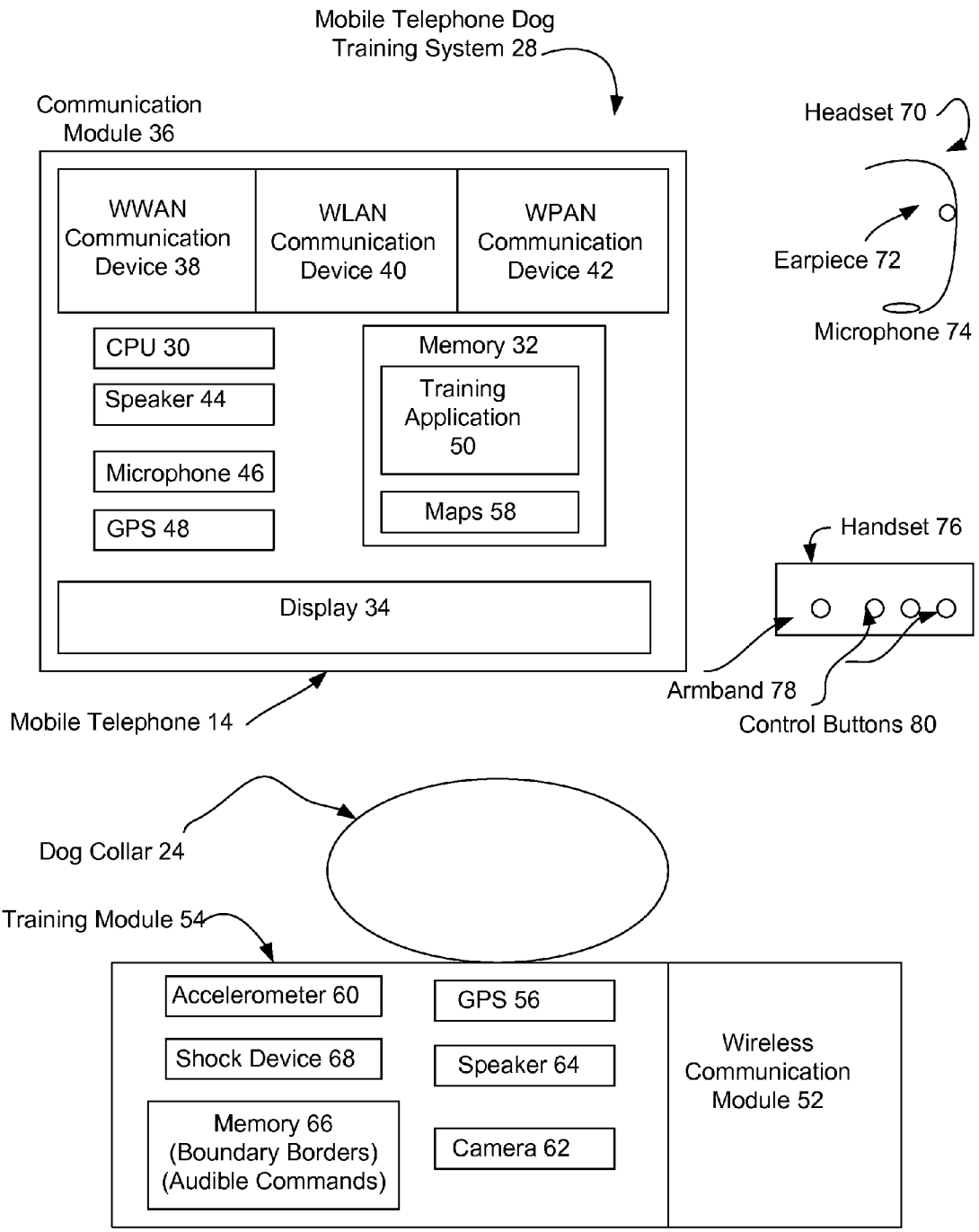
FIG. 2 depicts a block diagram of a mobile telephone dog training system.

Referring now to FIG. 2, a block diagram depicts a mobile telephone dog training system 28. Mobile telephone 14 is a smartphone having a CPU 30 and memory 32 that cooperate to execute instructions and present information as visual images at a touchscreen display 34. A communications module 36 cooperates with CPU 30 to perform smartphone communications. A WWAN communication device establishes communication with a WWAN, such as a mobile telephone service provider network that supports telephone circuit, text and Internet-type data interfaces. A WLAN communication device 40 establishes communication with a WLAN, such as an 802.11 network that supports Internet-type data interfaces. A WPAN communication device 42 establishes communication with a WPAN, such as Bluetooth or a 60 GHz band in a tri-band or WiGig network interface. Mobile telephone 14 includes a variety of other devices commonly found in smartphones, such as speaker 44 that outputs audible sounds, a microphone 46 that captures audible sounds and a GPS receiver 48 that determines a position of the device from GPS signals.

Mobile telephone 14 adapts for use as a dog training system by executing instructions of a training application 50 stored in memory 32, which coordinates the use of hardware and software of mobile telephone 14 for performing dog training functions. For example, training application 50 coordinates communication with dog collar 24 through communication module 36. In the example embodiment, dog collar 24 has a removably coupled wireless communication module 52 that couples to a training module 54 so that an end user can select the type of communications that the mobile telephone will have with collar 24. For instance, wireless communication module 52 may have single or plural types of receivers or transceivers for supporting different types of communications selected by an end user with different frequency bands and communication protocols. In one example embodiment, wireless communication module 52 is an analog or digital receiver, transmitter or transceiver radio in the amateur UHF or VHF radio bands that communicates with an adapter for the mobile telephone 14 as set forth in FIG. 3. In another example embodiment, wireless communication module 52 is a WWAN receiver, transmitter or transceiver that communicates in the WWAN band and protocol of mobile telephone 14. In another example embodiment, wireless communication module 52 is a WLAN receiver, transmitter or transceiver that communicates in a WLAN band and protocol of mobile telephone 14. Various combinations of receivers and transmitters may be couple to training module 14 as desired by an end user, including plural separate communication modules 52 each of which provide a different type of communication. For example, in one embodiment a WWAN transmitter permits sending of text messages to mobile telephone 14 with GPS position information while a WLAN receiver permits reception of shock collar stimulus commands. As another example, a WWAN receiver obtains a time stamp from a cell tower also in use by mobile telephone 14 so that the timeliness of commands sent through a WLAN interface can be verified at collar 24—this prevents delayed application of a shock stimulus sent by a WLAN command, which could otherwise correct a dog when the dog is no longer performing an inappropriate action.

Training module 54 may include a variety of components that support training functions in cooperation with training application 50. The training functions may be in one contiguous housing assembled from several separate housings to allow selection by an end user of desired functions. One example component is a GPS receiver 56, which determines the position of collar 24 from a GPS signal and provides the position information to mobile telephone 14 through wireless communication module 52. Training application 50 presents the GPS position of collar 24 at display 34 on a map 58 along with the position of mobile telephone 14 so that the end user can determine the relative position of collar 24 by looking at display 34. Another example component is an accelerometer 60, which detects movement of collar 24 and issues a point alert in the event of a lack of movement under predetermined conditions, such as for a predetermined time period, so that wireless communication module 52 communicates a point alert to mobile telephone 14. Another example component is a camera 62, which captures still or moving images of an area relative to collar 24 where a dog points and provides the images to mobile telephone 14 through wireless communications module 52. In one example embodiment, camera 62 is coupled to a dog separately from collar 24 and communicates images to collar 24 with a WPAN so that wireless communications module 52 can forward the images to mobile telephone 14. Another example component is a speaker 64, which provides audible commands, such as either recorded voice or whistle tweets stored in memory of collar 24, that a dog wearing collar 24 can hear. Speaker 24 may present audible commands, either recorded voice or whistle tweets, provided through a VoIP interface with mobile telephone 24 and communicated through wireless communication module 52. For instance, an end user can speak a command audibly captured at mobile telephone 14 and played at speaker 64 or may press a button that issues an audible command from memory of mobile telephone 14. Alternatively, speaker 64 may present audible commands, either recorded voice or whistle tweets, in response to texts or other data that retrieves the commands from a memory 66, such as a turn or a whoa command. Another example component is a shock device 68 that applies a shock to a dog that is wearing collar 24 in response to a command received through wireless communication device 52. In alternative embodiments, alternative types of positive or negative reinforcements may be used, such as a clicker that issues clicks, a squirter that squirts a fluid, a vibrator that vibrates, etc. . . .

Mobile telephone 14 includes WPAN communication that supports interactions with local peripheral devices to give a hunter hands-off interactions with collar 24. For example, a wireless headset 70 includes an earpiece 72 to play audible sounds in an end user's ears and a microphone 74 to capture commands by the hunter. Headset 70 interacts with a Bluetooth or other types of WPAN interfaces to communicate with mobile telephone 14. Another example is a wireless handset 76 that has an armband or other coupling device to make control buttons 80 accessible to a hunter in a convenient location distal mobile telephone 14. For instance, armband 78 couples to a hunter's wrist or gun to provide a collar selector that selects one of plural collars 24 at which to output a shock correction while the hunter's mobile telephone rests in a pocket or safe location. As another example, handset 76 keeps a body count of birds by species to help a hunter avoid violating a game bag limit. As the hunter gets a bird, the hunter hits a button associated with the species to allow training application 50 to track the number of the species taken. When a limit is reached, the hunter receives an audible warning in earpiece 72: "You have reached your pheasant bag limit, don't shoot!" Handset 76 can also be used to track other hunting information including location of points or flushes, water sources, or other geographic features which can be downloaded after the hunt for further analysis. In one example embodiment, the sound of a gun shot picked up by a microphone is recognized by training application 50 and automatically marked. At an appropriate time after the gun shot, the hunter is invited to speak a memo of what happened, which is save in association with the location. The inquiry may also include a request to update the body count. In one example embodiment, if the hunter responds to a body count inquiry with "shutup," no additions are made to the body count and the hunter is reminded that he should attend church on Sundays instead of hunt.

An example of the mobile telephone dog training system 28 in use follows, but is intended only as an example of how one embodiment of the system may be used. A hunter plans a hunt and stores the hunt boundary in a map 58 of memory 32 of mobile telephone 14 that the hunter retrieves from the Internet. The morning of the hunt, the hunter attaches first and second wireless communication modules 52 to collar 24 and puts the collar on his hunting dog. One wireless communication module 52 receives and transmits WWAN communications and the other receives and transmits 802.11(n) WLAN communications. The dog is released to hunt and disappears in cover. A moment later, accelerometer 60 detects that the dog has stopped moving and gone on point. The WLAN communication module 52 attempts to send a point alert to the hunter but fails to receive a response from training application 50. In response, the WWAN wireless communications module sends a text with the point alert to the hunter's telephone number. The hunter's mobile telephone 14 intercepts the text on its way to the cell tower and also receives the text message from the cell tower and, in response, issues a point alert through a WPAN to an ear piece 72 of wireless headset 70. The text includes the position of the point included from a GPS component 56 of collar 24 so that training application 50 provides the hunter with audible guidance towards the point position. As the hunter approaches, training application 50 initiates a video conference with camera 62 to capture an image of the point through WLAN communication device 40. If the point is on a skunk or snake, the hunter touches a control button 80 on a handset 76 secured to his wrist with an armband 78 to issue a shock from shock device 68. In one embodiment, the image includes infrared information to help distinguish varmints from birds. If the point is on a bird, the hunter issues a "WHOA" command from memory 66 or through a voice WLAN interface with speaker 64, such as a VoIP interface. As the hunter approaches the point position, a "flush" alert is issued to all mobile telephones interfaced with the WLAN so that all hunters are prepared. For instance, a training application running on each mobile phone monitors the dog position and the hunter position with WLAN communication and issues a flush alert when the hunter reaches a predetermined location proximate the dog. After the flush, training application 50 tracks the body count so that the hunter does not exceed his allowed bag limit.

Figure 3:
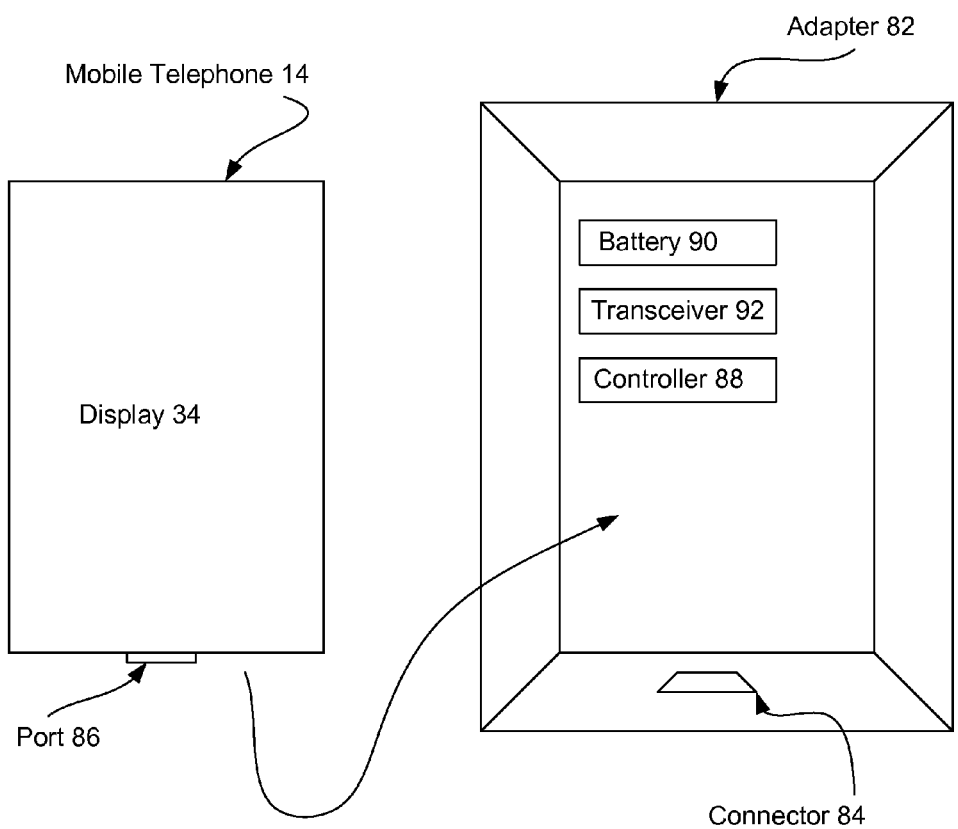
FIG. 3 depicts an adapter to accept a mobile telephone for interacting with a dog collar.

Referring now to FIG. 3, an adapter 82 is depicted to accept a mobile telephone 14 for interacting with a dog collar 24. Adapter 82 forms an opening to accept mobile telephone 14 with a connector 84 aligned to couple with a port 86 so that a controller 88 can interface with training application 50. Training application 50 provides information and instructions to controller 88 for sending and receiving communications with transceiver 92 of adapter 82, such as in a frequency band not available with the transceivers of mobile telephone 14. Adapter 82 includes a battery 90 to boost the charge life of mobile telephone 14 and a transceiver 92 to act as an intermediary between mobile telephone 14 and collar 24. Transceiver 92 offers improved radio communication range and reliability in a number of different ways depending on the user preference and the environment. For example, transceiver 92 provides increased range of communications from WLAN communications device 40 by amplifying or boosting WLAN signals. Alternatively, transceiver 92 communicates in a different radio band, such as a lower frequency band having greater range than the WLAN frequency band, with analog or digital signals to act as an intermediary communication medium when out of WLAN communication range. In one embodiment, training application 50 automatically detects the adapter and selects the radio band and protocol to use for communication based upon the range to collar 24. For instance, training application 50 uses a WLAN interface when the GPS position indicates collar 24 is within WLAN range and uses the intermediary frequency of adapter 82 when the GPS position indicates collar 24 is out of WLAN range. Adapter 82 provides a more robust system for hunters who desire to spend extra money on the extra feature; however, for many infrequent hunters who use collar 24 for yard work and occasional hunting trips, a WLAN range of 250M provides adequate range and reliability. In one embodiment, adapter 82 includes a waterproof protective case to hold mobile telephone 14 in a secure manner. In one embodiment, a larger sized adapter works for tablet type of devices that can include WWAN and WLAN capabilities. In another alternative embodiment, adapter 82 includes a WPAN so that it can boost the range of a mobile telephone 14 that is maintained separately and not inserted into adapter 82. For example, a hunter can strap adapter 82 on his back with an extended antenna for better range and the adapter communicates through a WPAN with a mobile telephone in the hunter's pocket as if the mobile telephone were coupled in adapter 82.

Figure 4:
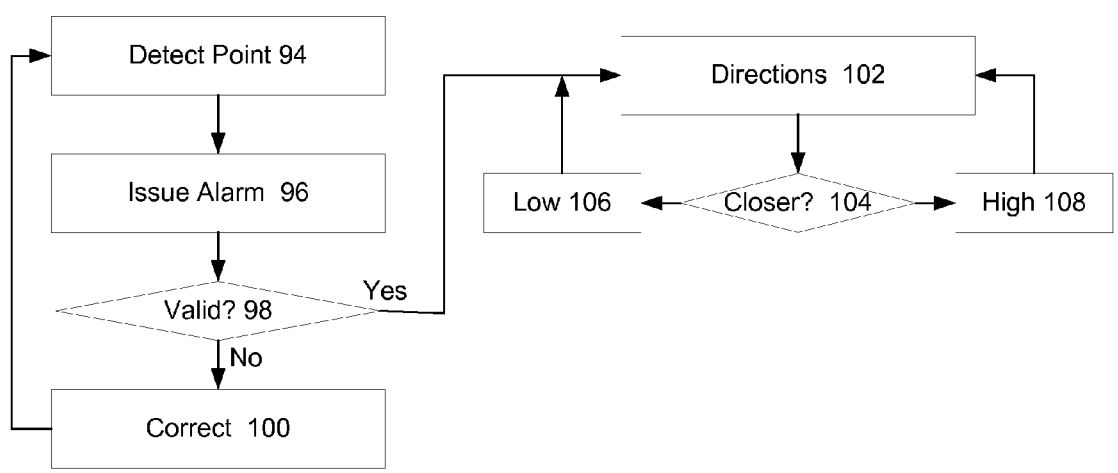
FIG. 4 depicts a flow diagram of a lock and tone process for guiding a hunter to a dog on point.

Referring now to FIG. 4, a flow diagram depicts a lock and tone process for guiding a hunter to a dog on point. The process begins at step 94 with detection of a point, such as with an accelerometer or lack of change of GPS position. At step 96, an audible point alarm is issued and an image of the point is presented at the mobile telephone display. In one embodiment, the alert and image is presented from the mobile telephone by a WPAN communication to glasses that the hunter is wearing along with a translucent map or a square or dot that indicates the location of collar 24 relative to the lens of the glasses. The hunter is thus able to see a map of the dog's position and an indication with a red dot or "target box" of where the hunter should look to see the dog through the glasses. At step 98, a determination is made of whether the point is a valid point on a game bird species or an invalid point, such as a point on a non-bird animal (a snake or skunk). If not a valid point, the process goes to step 100 to issue a correction, such as a shock stimulus, and returns to step 94. If a valid point at step 98, the process continues to step 102 to provide directions to the location of the point. If at step 104 a determination is made that mobile telephone position has moved further from the point position, the process continues to step 106 to issue a lower tone sound and then returns to step 102. If at step 104 a determination is made that the mobile telephone position has moved closer to the point position, the process continues to step 108 to issue a higher tone sound and then returns to step 102. Alternatively, directions at step 102 can present as computer generated audible directions, such as turn left or right, or flush in 10 yards.

Although the present invention has been described in detail, it should be understood that various changes, substitutions and alterations can be made hereto without departing from the spirit and scope of the invention as defined by the appended claims.

What is claimed is:
1. A dog training tool comprising:
a mobile telephone having a processor, memory, GPS receiver and a communication module operable to establish a WWAN interface with a mobile telephone circuit, a WPAN interface with a WPAN and a WLAN interface with a WLAN;
an adapter having a controller, a WPAN interface and a VHF transceiver, the adapter communicating with the mobile telephone through the WPAN interface;
a collar adapted to couple to a dog, the collar having a VHF transceiver operable to communicate with the adapter, an accelerometer operable to detect movement of the collar and having a GPS receiver operable to detect a GPS position, the VHF transceiver configured to send the GPS position to the adapter upon detection of movement by said accelerometer of the dog collar by a predetermined distance from the GPS position at which the VHF transceiver last sent a GPS position, and to send the GPS position after a predetermined time elapses if the detection of movement of the dog collar by the predetermined distance does not take place before the predetermined time elapses; and a training application stored in memory of the mobile telephone and operable to execute on the processor of the mobile telephone, the training application operable to present the GPS position received by the adapter through the adapter VHF transceiver and forwarded from the adapter to the mobile telephone through the WPAN interface, the training application present the GPS position on a display of the mobile telephone.

2. The dog training tool of claim 1 wherein the adapter communicates with the collar over a VHF frequency not supported by the mobile telephone, the dog training tool further comprising a training module integrated in the collar and having a shock device operable to apply a shock to the dog in response to a WLAN communication directly from the mobile telephone to the collar communication module.

3. The dog training tool of claim 2 further comprising a handset separate from the mobile telephone and interfaced with the application through a wireless personal area network, the handset accepting inputs for the shock collar and communicating the inputs to the mobile telephone through the personal area network for communication through the WLAN to the collar.

4. The dog training tool of claim 3 wherein the handset comprises a Bluetooth device having at least one input button coupled to an armband operable to couple to an arm.

5. The dog training tool of claim 2 wherein the training module comprises a camera aligned to capture an image of an area associated with a point by the dog, the image communicated to the mobile telephone through the WLAN for presentation at a display of the mobile telephone.

6. The dog training tool of claim 5 wherein the image is operable to capture a non-bird animal and the training module further comprises a shock device operable to administer a shock to the dog for discouraging a point at a non-bird animal.

7. The dog training tool of claim 2 wherein the training module comprises a speaker, the training application operable to issue commands from the speaker for the dog.

8. The dog training tool of claim 2 wherein the training module is further operable to establish an ad hoc 802.11 WLAN interface with a training module executing on another mobile telephone to coordinate communications relating to dog collars controlled by the training modules.

9. The dog training tool of claim 8 wherein the training modules coordinate VoIP communications through the ad hoc 802.11 WLAN interface.

10. A system for training a dog, the system comprising:
a mobile telephone having a processor, memory, display and plural wireless communication devices including at least a short-range WPAN wireless communication device, the mobile telephone operable to communicate with a mobile telephone network to support wireless telephone calls and having a GPS receiver operable to present the position of the mobile telephone on a map presented at the display;
an adapter having a controller and a short-range WPAN wireless communication device, the adapter interfaced with the mobile telephone through the short-range WPAN wireless communication devices and having a separate longer-range wireless communication device for communicating with one or more dog collars;
a dog collar having a GPS receiver operable to determine the position of the dog collar, an accelerometer operable to detect a change in position of the dog collar and a longer-range wireless communication device to communicate the position of the dog collar to the adapter longer-range wireless communication device, the adapter forwarding the position to the mobile telephone through the short-range WPAN wireless communication device, the dog collar communicating the position of the dog collar to the adapter with the longer-range wireless communication device after each change in position of the dog collar by at least a predetermined distance from the position at which the dog collar last communicated using the longer-range wireless communication device to transmit to the adapter, the dog collar further communicating the position of the dog collar after a predetermined time period elapses if the position of the dog collar does not change by the predetermined distance in the time period; and a training application stored in the mobile telephone memory and operable to execute on the processor to present the dog collar position on the map.

11. The system of claim 10 further comprising a speaker integrated in the mobile telephone, the training application giving audible directions through the speaker to indicate a direction to the dog collar based upon the dog collar GPS position and a GPS position detected by the mobile telephone.

12. The system of claim 11 wherein the dog collar further comprises a shock device operable to apply an electric shock to a dog in response to an input made through the training application.

13. The system of claim 10 wherein at least one of the mobile telephone wireless communication devices comprises a personal area network device, the system further comprising a headset interfaced with the mobile telephone by the personal area network device, wherein the training application is further operable to present audible information at the headset regarding the position of the dog collar.

14. A dog training tool comprising:
a mobile telephone having a processor, a memory, a GPS receiver operable to detect a GPS position of the mobile telephone and plural communication devices, the communication devices operable to establish a WWAN interface with a mobile telephone circuit, a WLAN interface with a WLAN, and a WPAN interface with a WPAN;
an adapter having a controller, a communication device operable to establish a WPAN interface with a WPAN and a wireless radio transceiver, the adapter interfaced with the mobile telephone through the WPAN;
a collar adapted to couple to a dog, the collar having a GPS receiver operable to determine a GPS position and a collar communication module operable to wirelessly communicate the GPS position with the adapter wireless radio transceiver;
a training application stored in the memory of the mobile telephone and operable to execute on the processor of the mobile telephone, wherein the training application is operable to obtain the GPS position of the collar from the adapter through the WPAN interface and present the GPS position of the collar on a map displayed at the mobile telephone; and
a microphone integrated in the mobile telephone, the microphone operable to detect an audible sound and represent the audible sound as a signal, wherein the training application is further operable to detect the microphone signal as a gunshot and store the GPS position of the mobile telephone in response to the detection of the gunshot.

15. The dog training tool of claim 14 wherein the mobile telephone has GPS receiver operable to determine a GPS position of the mobile telephone and the training application is further operable to query in response to the gunshot sound detection the event associated with the gunshot and to save a user response in association with the position.

16. The dog training tool of claim 14 further comprising a speaker integrated in the mobile telephone and interfaced with the training application through the WPAN, the speaker communicating the relative position of the collar to the mobile telephone based upon the collar and mobile telephone GPS positions.

17. The dog training tool of claim 16 wherein the speaker further comprises a Bluetooth earphone that presents sounds generated by the training application and sent through the WPAN.

18. The dog training tool of claim 16 wherein the speaker communicates the relative position with a first sound indicating that the mobile telephone is moving closer towards the collar and a second sound indicating that the mobile telephone is moving away from the collar.

19. The dog training tool of claim 16 wherein speaker communicates a flush alert based upon a predetermined distance of the mobile telephone to the collar.

20. The dog training tool of claim 14 wherein the training application is further operable to select either direct communication between the mobile telephone and collar or communication between the mobile telephone and collar supported through the adapter.

21. The dog training tool of claim 20 wherein the direct communication of the mobile telephone and collar is through the WLAN and the communication supported through the adapter is through an intermediary frequency, the training application selecting the intermediary frequency when WLAN communication is out of range.

22. The dog training tool of claim 14 wherein the training application is further operable to establish an ad hoc 802.11 WLAN network interface with a training application running on a separate mobile telephone, the training application obtaining collar position information from the separate mobile telephone.

23. The dog training tool of claim 14 wherein the training application coordinates communication directly between the mobile telephone and collar if the collar is in range for direct communications and indirectly between the mobile telephone and collar through a WWAN if the mobile telephone and collar are not in range for direct communications.

* * * * *